(12) United States Patent
Wai et al.

(10) Patent No.: US 11,247,917 B2
(45) Date of Patent: Feb. 15, 2022

(54) EXTRACTING METALS FROM FRESH WATER WITH AMIDOXIME-CARBOXYLATE ADSORBENTS

(71) Applicant: LCW Supercritical Technologies Corporation, Seattle, WA (US)

(72) Inventors: Chien M. Wai, Moscow, ID (US); Horng-Bin Pan, Moscow, ID (US)

(73) Assignee: LCW Supercritical Technologies Corporation, Moscow, ID (US)

(*) Notice: Subject to any disclaimer, the term of this patent is extended or adjusted under 35 U.S.C. 154(b) by 184 days.

(21) Appl. No.: 16/743,523

(22) Filed: Jan. 15, 2020

(65) Prior Publication Data
US 2020/0148556 A1    May 14, 2020

Related U.S. Application Data

(62) Division of application No. 15/179,766, filed on Jun. 10, 2016, now Pat. No. 10,570,027.

(51) Int. Cl.
*C02F 1/28* (2006.01)
*B01J 20/26* (2006.01)
(Continued)

(52) U.S. Cl.
CPC ............ *C02F 1/285* (2013.01); *B01J 20/264* (2013.01); *B01J 20/28023* (2013.01);
(Continued)

(58) Field of Classification Search
None
See application file for complete search history.

(56) References Cited

U.S. PATENT DOCUMENTS

| 3,063,951 A | 11/1962 | Schouteden |
| 3,083,080 A | 3/1963 | Schouteden |

(Continued)

FOREIGN PATENT DOCUMENTS

| FR | 2252438 | 6/1975 | |
| FR | 2252438 A1 * | 6/1975 | ............ D06M 11/63 |
| WO | WO-2014031702 A1 * | 2/2014 | ............... G21F 9/12 |

OTHER PUBLICATIONS

Machine translation of FR-2252438-A1, pp. 1-5. (Year: 1975).*

(Continued)

*Primary Examiner* — Clare M Perrin
(74) *Attorney, Agent, or Firm* — Jacques M. Dulin, Esq.; Innovation Law Group, Ltd.

(57) ABSTRACT

A metals-adsorbent PAN fiber comprising a carbon chain backbone and amidoxime, carboxylate, and nitrile pendant groups. No ester groups are present. The inventive fiber is used for removing metals, including toxic metals, from fresh water, including rivers, streams, lakes, ponds, drinking water from wells and other sources, and industrial discharge waste waters, in a pH range of 3-10, and preferably at slightly acidic conditions in the range of pH 5-6. Metals that can be removed include heavy and toxic metals, such as Sc, V, Mn, Fe, Co, Ni, Cu, Sr, Yb, Cd, Cs, Pb, La, Ce, Nd, Eu, Zn, Tb and U. The adsorbed metals can be removed from the fiber by acidic elution and recovered. The fiber can be rinsed and reused.

17 Claims, 2 Drawing Sheets

(51) Int. Cl.
B01J 20/28 (2006.01)
C08F 8/12 (2006.01)
C08F 8/30 (2006.01)
C02F 101/10 (2006.01)
C02F 103/08 (2006.01)
C02F 103/20 (2006.01)
C02F 101/00 (2006.01)

(52) U.S. Cl.
CPC .......... *B01J 20/28033* (2013.01); *C08F 8/12* (2013.01); *C08F 8/30* (2013.01); *C02F 2101/006* (2013.01); *C02F 2101/10* (2013.01); *C02F 2103/08* (2013.01); *C02F 2103/20* (2013.01)

(56) References Cited

U.S. PATENT DOCUMENTS

| | | | |
|---|---|---|---|
| 5,064,879 A * | 11/1991 | Shiga | B01J 20/26 521/38 |
| 10,391,472 B2 | 8/2019 | Dai et al. | |
| 2010/0213134 A1* | 8/2010 | Campbell | C02F 1/42 210/682 |
| 2013/0071659 A1 | 3/2013 | Janke et al. | |
| 2017/0326530 A1* | 11/2017 | Dai | B01J 20/28023 |

OTHER PUBLICATIONS

Kawai et al. (Radiation Physics and Chemistry, 2000, 59, 405-411. (Year: 2000).*
Katragadda et al., "The extraction of uranium by amidoximated orlon," *Talanta*, 45(2): 257-263, Dec. 19, 1997.
Zhao et al., "A study on the degree of amidoximation of polyacrylonitrile fibers and its effect on their capacity to adsorb uranyl ions," *Ind. Eng. Chem. Res.*, vol. 54, pp. 3101-3106, Mar. 11, 2015.
Bayramoglu et al., "MCM-41 silica particles grafted with polyacrylonitrile,: Modification in to amidoxime and carboxyl groups for enhanced uranium removal from aqueous medium," *Microporous and Mesoporous Materials*, vol. 226, pp. 117-124, Dec. 30, 2015.
International Search Report and Written Opinion issued for International Application No. PCT/US201726663 dated Dec. 20, 2017.
Choi et al., "Adsorption of $UO^{2+2}$ by polyethylene adsorbents with amidoxime, carboxyl, and amidoxime/carboxyl group," *Radiation Physics and Chemistry*, vol. 57, pp. 187-193, 2000.
Das et al., "Extracting Uranium from Seawater: Promising AF Series Adsorbents," *Ind. Eng. Chem. Res.*, vol. 55, pp. 4110-4117, Nov. 2, 2015.
Das et al., "Extracting Uranium from Seawater: Promising AI Series Adsorbents," *Ind. Eng. Chem. Res.*, vol. 55, pp. 4103-4109, Nov. 10, 2015.
Das et al., "Novel poly(imide dioxime) sorbents: Development and testing for enhanced extraction of uranium from natural seawater," *Chemical Engineering Journal*, vol. 298, pp. 125-135, Apr. 9, 2016.
Gill et al., "The Uranium from Seawater Program at the Pacific Northwest National Laboratory: Overview of Marine Testing, Adsorbent Characterization, Adsorbent Durability, Adsorbent Toxicity, and Deployment Studies," *Ind. Eng. Chem. Res.*, 55(15): 4264-4277, Feb. 7, 2016.
Kato et al., "Preparation of Amidoxime Fibers for Recovery of Uranium from Seawater," *Journal of Chemical Engineering of Japan*, 23(6): 744-750, 1990.
Kawai et al., "Comparison of Amidoxime Adsorbents Prepared by Cografting Methacrylic Acid and 2-Hydroxyethyl Methacrylate and Acrylonitrile onto Polyethylene," *Ind. Eng. Chem. Res.*, vol. 39, pp. 2910-2915, 2000.
Kawai et al., "Preparation of hydrophilic amidoxime fibers by cografting acrylonitrile and methacrylic acid from an optimized monomer composition," *Radiation Physics and Chemistry*, vol. 59, pp. 405-411, 2000.
Kobuke et al., "Composite Fiber Adsorbent for Rapid Uptake of Uranyl from Seawater," *Ind. Eng. Chem. Res.*, vol. 27, pp. 1461-1466, 1988.
Kuo et al., "Characterization and Testing of Amidoxime-Based Adsorbent Materials to Extract Uranium from Natural Seawater," *Ind. Eng. Chem. Res.*, 55(15): 4285-4293, Nov. 19, 2015.
Lindner et al., "Review of cost estimates for uranium recovery from seawater," *Energy Economics*, vol. 49, pp. 9-22, Feb. 14, 2015.
Pan et al., "Towards Understanding KOH Conditioning of Amidoxime-based Polymer Adsorbents for Sequestering Uranium from Seawater," *RSC Advances*, No. 122, pp. 100715-100721, Nov. 17, 2015.
Saito et al., "Characteristics of Uranium Adsorption by Amidoxime Membrane Synthesized by Radiation-Induced Graft Polymerization," *Journal of Membrane Science*, vol. 34, pp. 307-315, 1987.
Saito et al., "Porous Amidoxime-Group-Containing Membrane for the Recovery of Uranium from Seawater," *Ind. Eng. Chem. Res.*, vol. 26, pp. 1977-1981, 1987.
Sekiguchi et al., "Effect of Seawater Temperature on Uranium Recovery from Seawater Using Amidoxime Adsorbents," *Ind. Eng. Chem. Res.*, 33(3): 662-666, 1994.

* cited by examiner

EXTRACTING METALS FROM FRESH WATER WITH AMIDOXIME-CARBOXYLATE ADSORBENTS

BACKGROUND

While extraction of uranium from seawater is an area of interest as a means to provide a stable and economic supply of fuel for nuclear reactors, extraction of heavy metals from fresh water supplies is equally important, particularly for environmental considerations. Amidoxime-based polymer adsorbents have been extensively studied for the last several decades as the most promising approach for sequestering uranium from seawater because of their high uranium adsorption capacities. We have now discovered that this class of inventive fiber adsorbents can extract a wide range of metals from fresh water at different conditions than those used for removal of U from seawater.

SUMMARY

Disclosed herein is an inventive metals-adsorbent fiber comprising a carbon chain backbone having amidoxime, carboxylate, and nitrile pendant groups that can remove metals from fresh water sources.

Also disclosed herein is a polymer having a repeating unit of:

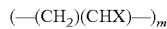

wherein each X is the same or different and is a pendant group selected from amidoxime, carboxylate, and nitrile groups, provided that the polymer includes at least one amidoxime pendant group, at least one carboxylate pendant group, and at least one nitrile pendant group; and n is 100 to 10000.

Further disclosed herein is a polymer having a structure comprising:

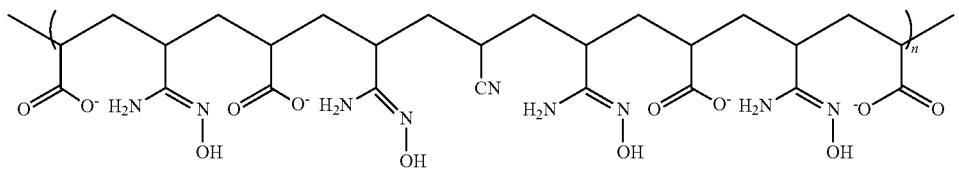

wherein n is 100 to 10000.

Additionally disclosed herein is a method for making a functionalized fiber comprising:

a) subjecting an acrylic, polyacrylonitrile, and/or polyacrylonitrile copolymer fiber to amidoximation under conditions sufficient for converting a portion of the nitrile pendant groups of the acrylic, polyacrylonitrile, and/or polyacrylonitrile copolymer fiber into amidoxime pendant groups resulting in an intermediate product; and b) subjecting the intermediate product to alkaline hydrolysis under conditions sufficient for converting a portion of the remaining nitrile pendant groups into carboxylate pendant groups and all of the ester pendant groups into carboxylate pendant groups, providing that nitrile pendant groups remain after the alkaline hydrolysis.

The foregoing will become more apparent from the following detailed description, which proceeds with reference to the accompanying figures.

DETAILED DESCRIPTION

Figure 1A:
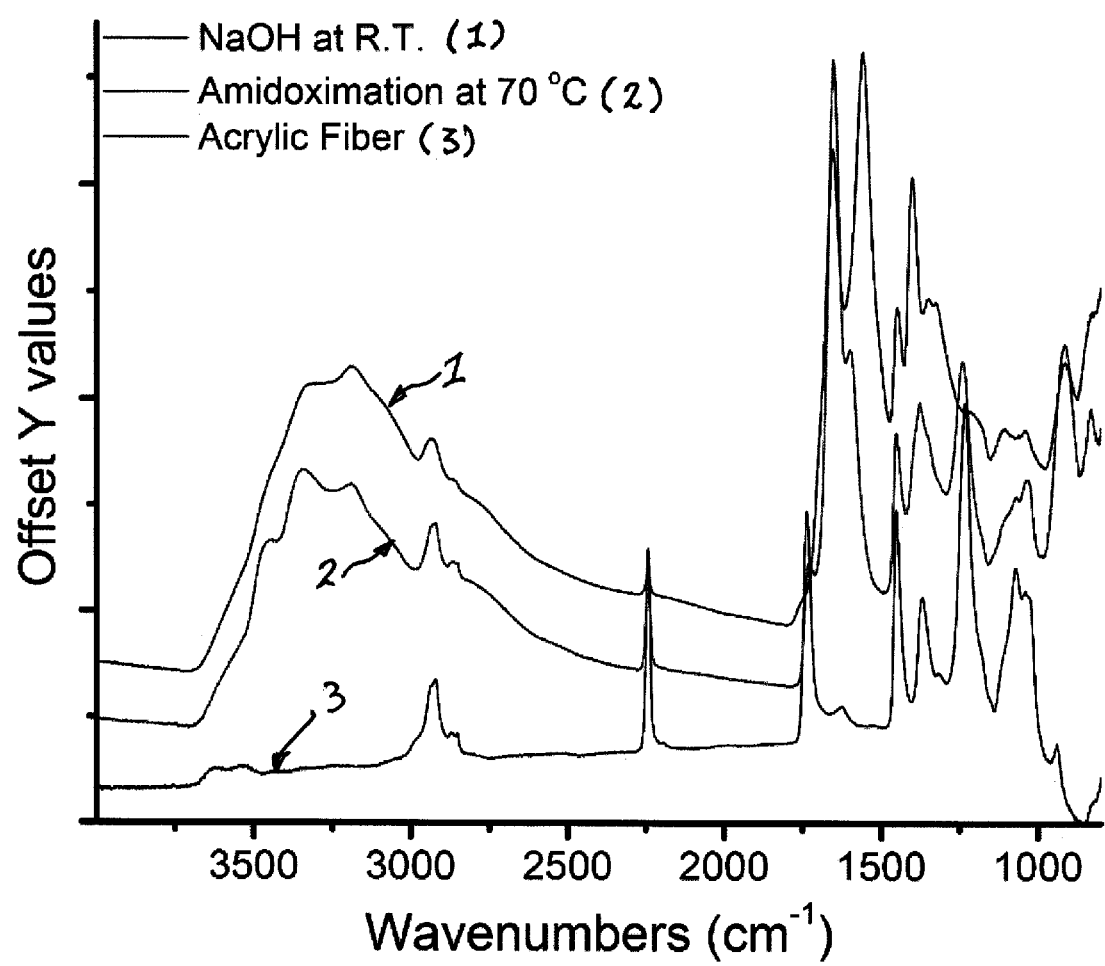
FIGS. 1A and 1B show FTIR spectra of acrylic fiber, original (black), after $NH_2OH$ treatment (red), and after NaOH treatment (blue); the peak intensity of each functional group is proportional to its concentration in the fiber.

There are several ways in which metals removal from fresh water sources can be made economically feasible. The most straightforward approach is to reduce the cost of producing the adsorbent. Another approach is to provide a single adsorbent that has the capacity to remove multiple metals from a fresh water source in a single pass. Still another approach is to increase the capacity of the adsorbent, such that more metal quantity can be extracted per unit mass of adsorbent. Hence, any increase in adsorbent capacity (i.e. g of metal/kg of adsorbent) will directly be reflected in the cost to treat fresh water. Finally, making an adsorbent more durable so that it can be used through multiple adsorption/elution cycles (or reuse of the adsorbent) will also lower the cost of metal removal from fresh water sources.

Disclosed herein is a new methodology for producing amidoxime-functionalized polymer adsorbents for the extraction of metals from fresh water sources. The methodology uses inexpensive and commercially available materials that will significantly reduce the cost associated with extraction of metals from fresh water, while at the same time produces an adsorbent that has equal or better adsorption capacity for metals than the best known adsorbents described in the literature. This advancement will have a significant impact on the advancement of the technology to extract metals from freshwater and more importantly, make it cost competitive with mining metals from terrestrial sources.

The methodology differs from previous approaches and may have advantages in several areas including: (1) it does not require a radiation-induced grafting step that significantly reduces cost and effort of adsorbent production; (2) it produces a product that has much higher mechanical strength enabling a more robust product, especially for adsorbent reuse; (3) the adsorbents produced by radiation induced grafting require a treatment with potassium hydroxide to initiate their adsorption capability, the adsorbent disclosed herein does not; (4) this synthesis using acrylic fiber as the starting backbone, differs from the commonly used polyethylene used in radiation induced grafting synthesis approaches; and (5) the inventive adsorbent fibers contain no ester groups and can adsorb U and other metals over a pH range from 3 to 10.

The mild conversion conditions (low temperature and short reaction times) of this invention produce a final product that is composed primarily of branched or open chain amidoxime functional groups rather than cyclic amidoxime functional groups. In certain embodiments, the final product includes no, or is substantially free of, cyclic amidoxime functional groups (i.e., all of the amidoxime functional groups are branched or open chain). This feature results in reducing disproportionate binding, e.g., the binding of vanadium in favor of uranium. The saturation reaction rate of this adsorbent is considerably faster than amidoxime-based adsorbents prepared by radiation induced grafting approaches. For example, the radiation-induced grafted amidoxime-based polymeric adsorbents have half saturation times of approximately 3 weeks for adsorption of uranium from seawater, while the amidoxime-based adsorbents described herein have half saturation times of approximately 2 weeks.

In certain embodiments, the functionalized polymer product has a carbon chain backbone that includes amidoxime, carboxylate, nitrile, and ester pendant groups. In certain examples, the functionalized polymer product may have a repeating unit of:

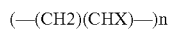

wherein each X is the same or different and is a pendant group selected from amidoxime, carboxylate and nitrile groups provided that the polymer includes at least one amidoxime pendant group, at least one carboxylate pendant group, and at least one nitrile pendant group; and n is 100 to 10000, more particularly 1000 to 5000.

In certain embodiments, the amidoxime pendant group has a structure of:

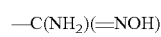

In certain embodiments, the carboxylate pendant group has a structure of:

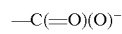

Illustrative groups for the carboxylate cation include Na+, K+, Cs+, Ca++, Mg++, NH4+, and similar cations.

In certain embodiments, the nitrile pendant group has a structure of: —CN.

It has been discovered that the ratios of amidoxime to carboxylate group and the unreacted nitrile pendant groups on the backbone fiber are important to controlling adsorption capacity and adsorption durability. In certain embodiments, the amidoxime/carboxylate mol ratio may range from 1:3 to 3:1, more particularly the ratio is 1:2 to 2:1. In certain embodiments, the amidoxime pendant groups are present in an amount of 20 to 80 mol %, more particularly 40 to 60 mol %, the carboxylate pendant groups are present in an amount of 80 to 20 mol %, more particularly 60 to 40 mol %, the unreacted nitrile pendant groups are present in an amount of greater than 0 to 30 mol %, more particularly 5 to 15 mol %, based on the total mols of the polymer. The functionalized polymer product contains unreacted nitrile groups on the backbone chain.

In one embodiment, the functionalized polymer product has a structure comprising:

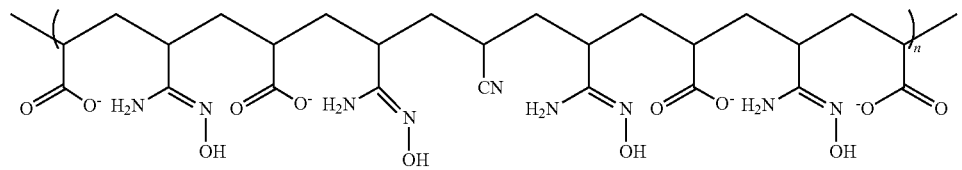

wherein n is 100 to 10000, more particularly 1000 to 5000.

Illustrative groups for the carboxylate cation include Na+, K+, Cs+, Ca++, Mg++, NH4+, and similar cations. In certain embodiments, the cation on the carboxylate is Na+, which comes from the NaOH used to convert CN to carboxylate. An alternate is K+ if KOH is used for the conversion.

In one embodiment, the functionalized polymer product may be synthesized according to the following scheme:

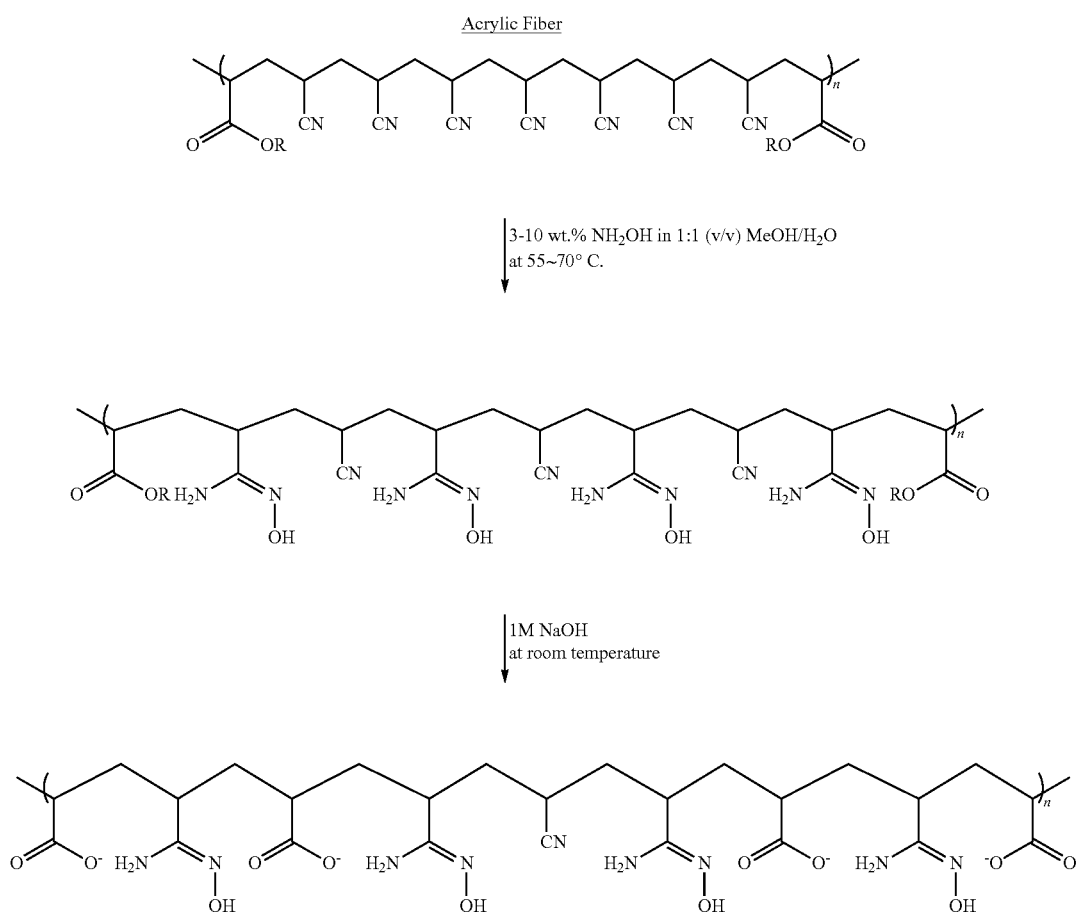

wherein R is an alkyl, particularly C1-C6 alkyl, such as, for example, methyl, ethyl, propyl, isopropyl, butyl, iso-butyl, sec-butyl, pentyl, 3-pentyl, or hexyl; a substituted alkyl, a cycloalkyl, a heterocycloalkyl, an aryl, or a heteroaryl group; and n is 100 to 10000, more particularly 1000 to 5000.

One step (amidoximation) involves converting a portion (less than 100%) of the nitrile pendant groups into amidoxime pendant groups. The amidoximation reaction time may range from 0.25 to 72 hours, the temperature may range from 30 to 80° C., and the amount of hydroxylamine hydrochloride ranges from 3-6%. The active reagent as the reaction occurs is hydroxylamine ($NH_2OH$). The production of hydroxylamine can be achieved from hydroxylammonium hydrochloride (Hyd-HCl) by neutralizing with a base such as KOH or NaOH to prepare hydroxylamine ($NH_2OH$). For example, an acrylic fiber (e.g. commercially available Orlon® yarn) is treated with a 3 weight % $NH_2OH$ solution made of 1:1 (volume ratio) methanol-$H_2O$ at temperature between 55-70° C. for 0.5 hour to 7 hours.

Another step of alkaline hydrolysis involves converting a portion (less than 100%) of the remaining nitrile groups into carboxylate groups and all of the ester groups into carboxylate groups. The hydrolysis reaction time may range from 8 to 24 hours, the temperature is room temperature, and the amount of sodium hydroxide may range from 0.5 to 2.0 M. Alternatives to sodium hydroxide include KOH, CsOH, ammonium hydroxide, and other alkali solutions. For example, after the first step, the intermediate fiber is treated with 1 M NaOH at room temperature for 24 hours.

In certain embodiments, the amidoximation and alkaline hydrolysis may be performed in reverse order from what is shown above.

The starting material may be an acrylic, polyacrylonitrile (PAN), and/or poly-acrylonitrile copolymer fiber. For example, the polyacrylonitrile fiber may contain 15% ester copolymer. The fiber may be in the form of a monofilament or a multifilament yarn. In certain embodiments, the acrylic fiber or a multifilament yarn such as Orlon or Acrylan may have a diameter of 5 to 200 µm. One example of an acrylic fiber is commercially available Orlon® yarn. In an important alternative form, the fiber may be chopped into short lengths and packed as such into tubes through which fresh water to be treated is passed.

The surface functionality (i.e. pendant groups) during synthesis and in the final product may be monitored via FTIR or by determining the conversion ratio of the nitrile groups. The conversion determination is a simple —CN peak measurement before and after the synthesis:

% Conversion=$(I_o-I_t)/I_o \times 100\%$ where $I_o$ is the intensity of the original nitrile peak and $I_t$ is the intensity of the nitrile peak after amidoximation.

Figure 1B:
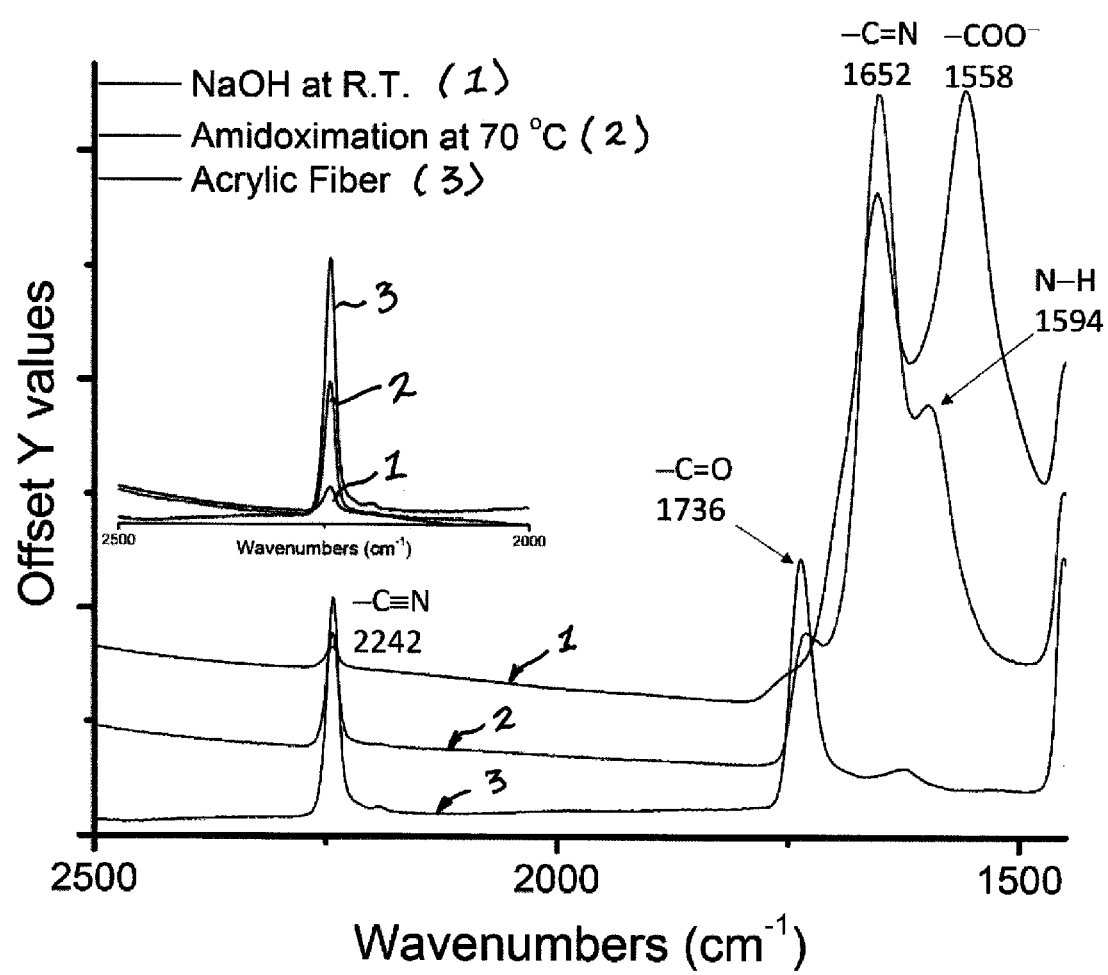

The FTIR methodology involves the use of infrared spectroscopy to control the relative composition of the pendant functional groups as shown in FIGS. 1A and 1B. For example, the decrease in the nitrile peak intensity at 2242 $cm^{-1}$ and the increase in —C≡N peak intensity at 1652 $cm^{-1}$ in the first step of $NH_2OH$ treatment (amidoximation step)

is a measure of the amount of the nitrile groups converted to amidoxime groups. In the second step of NaOH treatment, the increase in —COO peak intensity at 1558 cm$^{-1}$ and further decrease in the nitrile peak intensity at 2242 cm$^{-1}$ is a measure of the amount of the nitrile groups converted to carboxylate groups. The remaining nitrile peak intensity at 2242 cm$^{-1}$ is a measure of the amount of final nitrile groups in the polymer adsorbent. In one example, the adsorbent with the highest metals adsorption capacity typically has the ratio of amidoxime:carboxylate:nitrile=45%:45%:10%.

The functionalized product may be in the form of a fiber. The fiber may be provided in the form of a monofilament, a multifilament yarn, a fabric, textiles thereof or a mass of individual short fibers. In certain embodiments, the functionalized fiber or a multifilament yarn may have a diameter of 5 to 200 μm.

In one aspect, the final amidoxime/carboxylate-containing polymer fibers showed very high metals adsorption capacities (e.g., greater than 3.0 mg U per g of adsorbent after 21 days of exposure to seawater) tested in a flowing seawater column system. The test systems are described in Kuo et al, Characterization and Testing of Amidoxime-Based Adsorbent Materials to Extract Uranium from Natural Seawater. *Ind Eng Chem Res* 2016, 55, 4285-4293; Gill et al., The Uranium from Seawater Program at the Pacific Northwest National Laboratory: Overview of Marine Testing, Adsorbent Characterization, Adsorbent Durability, Adsorbent Toxicity, and Deployment Studies. *Ind Eng Chem Res* 2016, 55, 4264-4277; and Pan et al, Towards Understanding KOH Conditioning of Amidoxime-based Polymer Adsorbents for Sequestering Uranium from Seawater. *RSC Advances* 2015, 5, 100715-100721.

Prior amidoxime-based polymeric adsorbents are not exclusively selective for uranium. They adsorb many of the trace elements in seawater, most notably vanadium. An adsorbent that reduces the adsorption of vanadium will result in an increase in the capacity of uranium. The adsorption of U and V from seawater is related to the specific form of the amidoxime-binding ligand that is created on the adsorbent. Cyclic imidedioxime has a higher affinity for vanadium compared to uranium, while the single-meaning non-cyclic (open chain) amidoxime ligand-has a weak affinity for vanadium. Hence, an amidoxime-based adsorbent that reduces the abundance of the cyclic form of the amidoxime, will favor the sequestering of uranium over vanadium in seawater. Likewise, the non-cyclic, non-ester, amidoxime polymer of this invention is broadly effective for adsorbing a wide range of metals of the Periodic Table from fresh water at a wide range of pH, 3 to 10 and preferably mildly acidic conditions, e.g., pH 5-6, as compared to seawater adsorption which requires alkaline conditions, >pH 8.

An example of a non-cyclic diamidoxime ligand (in the structures above the amidoxime pendant group is shown as a single open-chain group) (left) and an example of a cyclic imidedioxime ligand (right) are shown below:

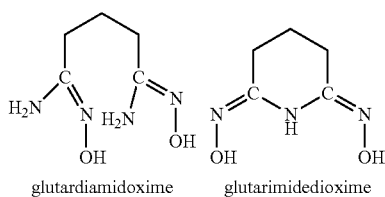

glutardiamidoxime    glutarimidedioxime

The non-ester amoidoxime/carboxylate adsorbent disclosed herein adsorbs Sc, V, Mn, Fe, Co, Ni, Cu, Sr, Y, Cd, Cs, Pb, La, Ce, Nd, Eu, Tb, and U from fresh water sources at mild acidic pHs, that is below pH 6. The adsorbent also retains smaller amounts of rare earth elements (e.g. Nd) and precious metals (Ag, Au, Pt, and Pd).

The non-ester amidoxime/carboxylate adsorbent disclosed herein is useful for metals extraction from freshwater and drinking water. In general, the inventive adsorbent is capable of extracting metals from any fresh water source at a pH of 3-10, and preferably in the pH range of about 5 to about 6.

The synthesis method disclosed herein uses at least two approaches to reduce the cost of the production of the adsorbent: (1) use a cheaper starting material for the adsorbent backbone, and (2) use a chemical process that eliminates the need for a radiation-induced grafting process step in the synthesis. Using acrylic fibers (PAN) as the starting material and with simple chemical treatments described herein, a highly efficient metals adsorbent can be produced with low production cost. This novel adsorbent synthesis approach makes extraction of metals from fresh water for environmental clean-up economically feasible.

Prior high capacity uranium adsorbents production involves a step where the surface of the adsorbent fiber is irradiated to create reactive sites using either an intense electron stream or gamma radiation from a radiation source. This is referred to as radiation-induced graft polymerization (RIGP). The process disclosed herein eliminates this step, and starts from a different polymer fiber, which will significantly reduce the cost of producing the adsorbent.

In addition, most of the prior amidoxime-based polymeric adsorbents require a "conditioning step" with potassium hydroxide prior to deployment in seawater. The inventive class of adsorbents do not require such a conditioning step.

As noted above, the ratios of amidoxime to carboxylate group and the unreacted nitrile on the backbone fiber are important to controlling adsorption capacity in fresh water and adsorption durability. Complete conversion of nitrile groups of PAN to amidoxime groups tends to weaken the mechanical strength of the fiber and makes the material less suitable for adsorption applications. This is particularly critical to adsorbent re-use. Partial conversion of the nitrile groups to amidoxime groups, as disclosed herein, increases the mechanical strength of the fibers. Leaving some of the nitrile groups unreacted on the backbone fiber is also critical to adsorbent durability.

The most common method reported in recent literature for producing an amidoxime-based adsorbent material involves a step where the backbone polymer is first irradiated using an electron beam or radiation source (referred to as radiation-induced grafting) to make reactive sites on the polymer surface to which functional groups can be attached. The presently disclosed process eliminates the radiation-induced grafting step, thus achieving a significant reduction in adsorption synthesis costs.

Seawater Example:

An acrylic (PAN) fiber (e.g. commercially available Orlon® yarn) is treated with a 3 weight % NH$_2$OH solution made of 1:1 (volume ratio) methanol-H$_2$O at temperature between 55-70° C. for 0.5 hour to 7 hours. After the first step, the intermediate fiber is treated with 1 M NaOH at room temperature for 24 hours. No ester groups are present in the final adsorbent product.

The adsorption capacity of uranium is approximately 4 g U/kg of adsorbent after 21 days of exposure in natural seawater (pH~8) at 20° C. and reaches a capacity of 6 g U/kg adsorbent after 56 days of exposure in natural seawater at 20° C. The adsorbent can be reused following stripping with KHCO₃ or weak acid (HCl) and rinsing in Deionized Water.

Fresh Water Examples:

Each of the following examples were carried out in a large beaker containing 400 ml of deionized (DI) water, chosen to determine adsorption without interference of other ion species. 10 ppm of the test metal was introduced, and 30 mg of chopped adsorbent amidoxime/carboxylate fiber of this invention was added. The solution was maintained in the pH range of 5-6, and the temperature was maintained at 22° C. The fiber was stirred for 60 minutes, withdrawn, and the metals were recovered by elution with 0.5N hydrochloric acid to determine the adsorption capacity as grams of metal recovered per Kg of adsorbent. The results were as follows:

TABLE 1

Metals absorbed by the inventive amidoxime-carboxylate adsorbent in fresh (deionized) water at room temperature

| Element | Adsorption capacity (g metal/kg adsorbent) | pH | Temperature (° C.) |
|---|---|---|---|
| Sc | 40 | 5-6 | 22 |
| V | 44 | 5-6 | 22 |
| Mn | 40 | 5-6 | 22 |
| Fe | 53 | 5-6 | 22 |
| Co | 47 | 5-6 | 22 |
| Ni | 55 | 5-6 | 22 |
| Cu | 144 | 5-6 | 22 |
| Sr | 70 | 5-6 | 22 |
| Y | 80 | 5-6 | 22 |
| Cd | 119 | 5-6 | 22 |
| Cs | 81 | 5-6 | 22 |
| Pb | 201 | 5-6 | 22 |
| La | 93 | 5-6 | 22 |
| Ce | 98 | 5-6 | 22 |
| Nd | 53 | 5-6 | 22 |
| Eu | 69 | 5-6 | 22 |
| Tb | 74 | 5-6 | 22 |
| U | 242 | 5-6 | 22 |

The metals tested are representative of the transition and main group elements, including from alkali, alkaline earth, lanthanides and actinides groups. The metals adsorbed on the fiber are stripped (eluted) with an acid solution, e.g., 0.5 M HCl. After elution, the fiber can be reconditioned for reuse to extract additional quantities of metals by soaking in mild alkaline solution, e.g., 0.5 M NaOH, followed by rinsing with Deionized Water. The acidic elutate can be neutralized to recover the metals.

INDUSTRIAL APPLICABILITY

It is clear that the inventive non-ester amidoxime/carboxylate adsorbent PAN fiber has application to a wide range of processes for the removal of metals from both sea and fresh water. As such, the inventive adsorbent fiber is robust enough for long periods of use in flowing sea and fresh water, lakes, ponds, rivers, streams, well water, dam water, and industrial and agricultural operation discharges, where removal of the metals listed, and their related metals in the same groups, is environmentally required or desirable. Accordingly, the inventive adsorbent fiber will become the standard for adoption in this metals-containing aqueous sources recovery field.

In view of the many possible embodiments to which the principles of the disclosed invention may be applied, it should be recognized that the illustrated embodiments are only preferred examples of the invention and should not be taken as limiting the scope of the invention.

What is claimed is:

1. A method of removing metals from fresh water containing said metals comprising contacting a supply of fresh water with a segment of a fiber comprising a polymer having a structure comprising:

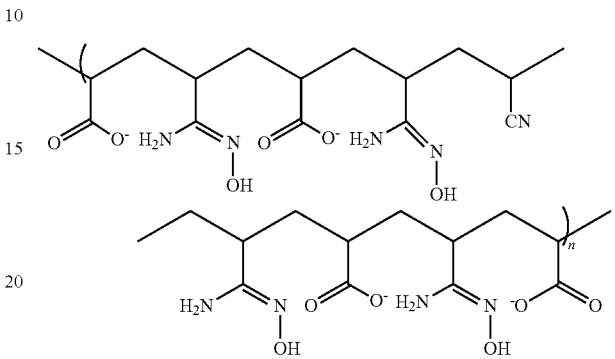

wherein n is in a range of from about 100 to about 10,000, and said contacting is effected under mildly acidic conditions.

2. A method as in claim 1 wherein metal is adsorbed onto said fiber and the method further comprises removing the adsorbed metal from said fiber.

3. A method as in claim 2 wherein said fiber further comprises at least one carboxylate cation selected from $Na^+$, $K^+$, $Cs^+$, $Ca^{++}$, $Mg^{++}$, and $NH_4^+$.

4. A method as in claim 2 wherein said fiber polymer is produced by the steps of:
   a) subjecting an acrylic, polyacrylonitrile, and/or polyacrylonitrile copolymer fiber to amidoximation under conditions sufficient for converting a portion of the nitrile pendant groups of the acrylic, polyacrylonitrile, and/or polyacrylonitrile copolymer fiber into amidoxime pendant groups resulting in an intermediate product; and
   b) subjecting the intermediate product to alkaline hydrolysis under conditions sufficient for converting a portion of the remaining nitrile pendant groups into carboxylate pendant groups.

5. A method as in claim 2 wherein said metal that is adsorbed onto said fiber is selected from the group consisting of at least one metal selected from Sc, V, Mn, Fe, Co, Ni, Cu, Sr, Yb, Cd, Cs, Pb, La, Ce, Nd, Eu, Tb and U.

6. A method as in claim 5, wherein said fiber has a diameter of 5 to 200 μm.

7. A method as in claim 2 wherein said removal step comprises contacting said fiber having adsorbed metal thereon with an acid to elute said metal from said fiber.

8. A method as in claim 7 wherein said eluted fiber is rinsed and reused to adsorb additional metal by contact with a fresh water source containing one or more metal.

9. A method as in claim 1, wherein n is in the range of from about 1000 to about 5000.

10. A method as in claim 9, wherein said fiber further comprises a $Na^+$ carboxylate cation.

11. A method as in claim 10, wherein said fiber is in a form of a monofilament, a multifilament yarn, fabric or fibers.

12. A method as in claim 11, wherein said fiber has a diameter of 5 to 200 μm.

13. A method as in claim 1 wherein said metal is selected from the groups of metals consisting of the alkaline earth metals, the transition metals, the precious metals, the lanthanides and the actinides.

14. A method as in claim 13, wherein said fiber is in a form of a monofilament, a multifilament yarn, fabric or fibers.

15. A method as in claim 14, wherein said fiber has a diameter of 5 to 200 μm.

16. A method as in claim 13 wherein said metal is selected from the group of metals consisting of the transition metals.

17. A method as in claim 13 wherein said metal is selected from Rb and Cs.

* * * * *